Feb. 19, 1963     W. B. AHERN ET AL     3,077,968
POSITIVE STOP MECHANISM
Filed March 31, 1960     3 Sheets-Sheet 1

INVENTORS
WILLIAM B. AHERN AND
BY DANIEL L. ORLOFF
Cromwell, Greist and Warden
ATTORNEYS.

Feb. 19, 1963  W. B. AHERN ET AL  3,077,968
POSITIVE STOP MECHANISM
Filed March 31, 1960  3 Sheets-Sheet 2

INVENTORS
WILLIAM B. AHERN AND
BY DANIEL L. ORLOFF
Cromwell, Greist
and Warden
ATTORNEYS

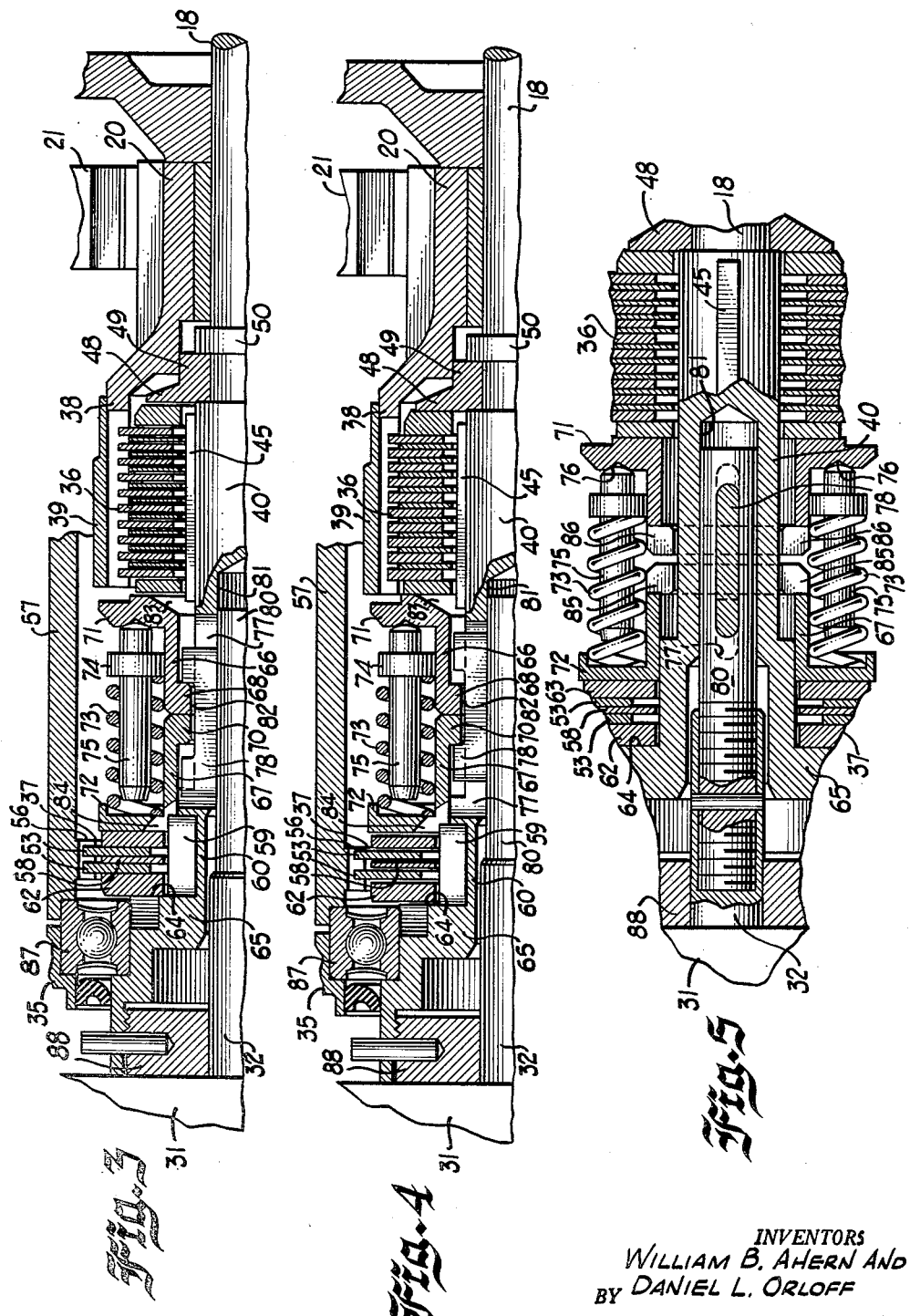

United States Patent Office 3,077,968
Patented Feb. 19, 1963

3,077,968
POSITIVE STOP MECHANISM
William B. Ahern and Daniel L. Orloff, Madison, Wis., assignors to Oscar Mayer & Co., Inc., Chicago, Ill., a corporation of Illinois
Filed Mar. 31, 1960, Ser. No. 19,049
9 Claims. (Cl. 192—148)

This invention relates to apparatus for controlling the movement of a rotatably mounted member and is more particularly concerned with improvemnets in a combination clutch and brake for controlling the application of power to a shaft and for bringing the shaft to a positive stop after predetermined rotation thereof.

It is a general object of the invention to provide an improved mechanism for controlling the rotation of a roll shaft or similar member which is in the form of a combined friction clutch and brake of the kind wherein the clutch and brake constitute a unit mounted in axially aligned relation on the shaft and having relative movement along the axis of rotation, with the clutch and brake members being axially spaced and having actuating mechanism associated therewith which is operative to keep either the brake or clutch engaged at all times.

It is a more specific object of the invention to provide a mechanism for controlling the rotation of a roll shaft or like member which comprises combination friction clutch and brake assemblies mounted on the extended end of the roll shaft and a double acting fluid operated power cylinder having its piston rod connected to the shaft for rotation about a common axis, with the piston rod being movable along said axis by control of the fluid in the cylinder while rotating with the shaft, the friction clutch and brake assemblies being mounted in axially spaced relation on the shaft and a drive member being rotatably mounted on the shaft adjacent the clutch assembly with the clutch plates connected to the shaft and the drive member, respectively, pressure members between the clutch and brake assemblies and operable to normally urge the plates in both the clutch and brake assemblies into engaged relation, and an axially movable actuator member connecting the ends of the roll shaft and the piston rod for simultaneous rotation and movable in one direction by the piston rod to engage the clutch and disengage the brake and in the opposite direction to engage the brake and disengage the clutch.

It is a further object of the invention to provide a mechanism for operating a roll shaft which comprises a drive member rotatably mounted on the shaft and power means to rotate the drive member, a combination friction plate clutch and brake mechanism mounted on the shaft adjacent the drive member, which clutch and brake mechanism comprises a clutch assembly mounted adjacent the drive member with the clutch plates connected to the shaft and the drive member, respectively, a brake assembly mounted in axially spaced relation to the clutch assembly with the brake plates connected to the shaft and a stationary member, respectively, compression springs extending between axially movable pressure plates for the clutch and br ke assemblies which springs normally urge the pressure plates in both the clutch and brake into eng ged relation, and a double acting fluid operated power cylinder having its piston rod mounted for rotation on a common axis with the roll shaft and having a keyed connection with the shaft and with the pressure plates so that the piston rod may be operated to axially move the pressure plates and the springs in one direction to re'ease the brake and increase the pressure on the clutch plates or in the opposite direction to release the clutch and increase the pressure on the brake plates whereby to operably connect the shaft and drive member so that the shaft rotates with the drive member and thereafter to disconnect the shaft and the drive member and to cause the shaft to be held stationary after the shaft has come to a positive stop.

These and other objects and advantages of the invention will be apparent from a consideration of the apparatus which is shown by way of illustration in the accompanying drawings wherein:

FIGURE 3 is a partial section similar to FIGURE 2 showing the mechanism with the brake engaged and the clutch disengaged;

FIGURE 4 is a section similar to FIGURE 3 showing the mechanism with the clutch engaged and the brake disengaged;

FIGURE 5 is a fragmentary section taken on the line 5—5 of FIGURE 2;

Figure 1:
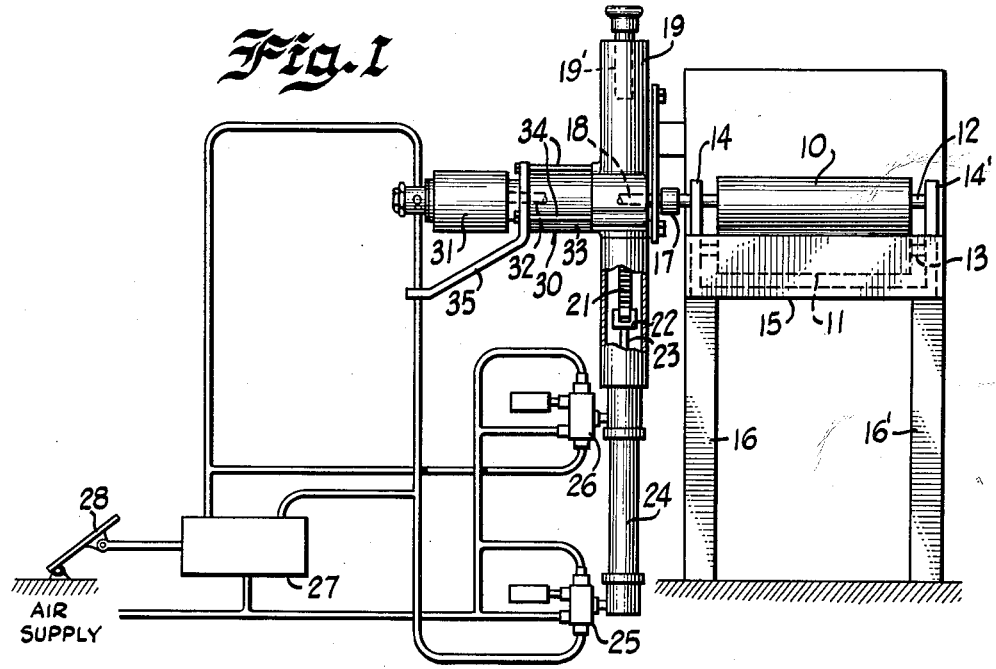
FIGURE 1 is an elevation, partially schematic, illustrating an apparatus for intermittently advancing a web between a pair of feed rollers, with one of the rol'ers being driven and its rotative movement controlled by a positive stop mechanism which embodies therein the principal features of the invention.
Figures 6, 7:
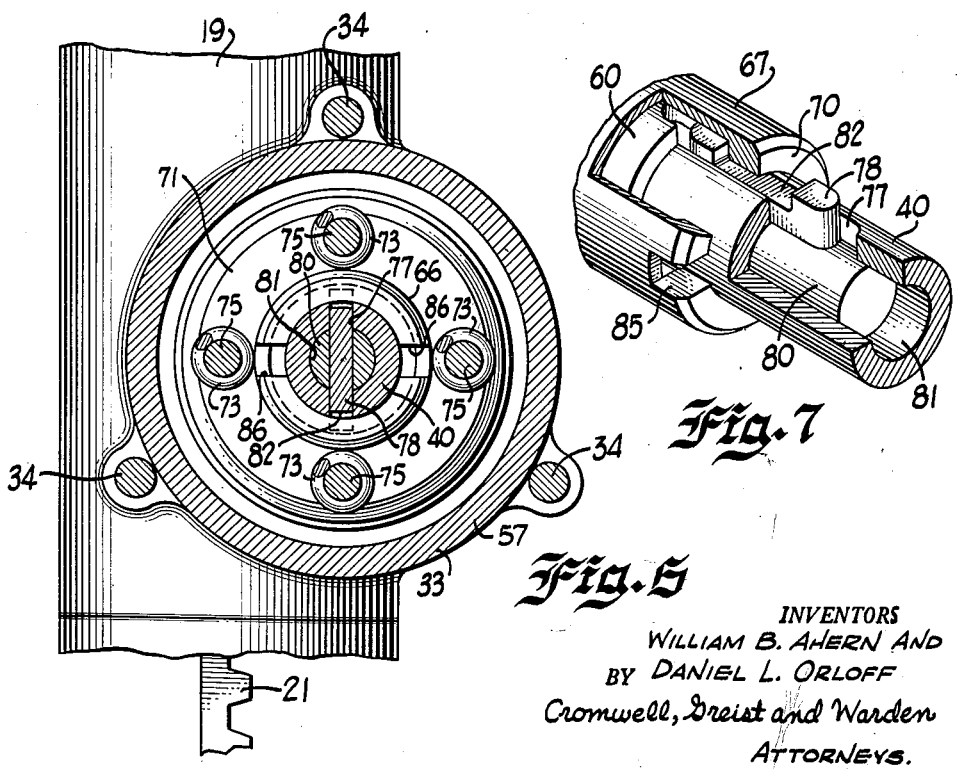
FIGURE 6 is a cross section taken on the line 6—6 of FIGURE 2.
FIGURE 7 is a fragmentary perspective view showing the location of the operating key member which is movable to actuate the brake and clutch.

Referring first to FIGURE 1, the apparatus is shown, for the purpose of illustration, as employed for controlling the driven roller 10 of a pair of web feeding rollers 10 and 11. The rollers 10 and 11 are mounted on shafts 12 and 13 which are journaled in upstanding bearing brackets 14 and 14' at opposite sides of a fluid containing tank 15, the latter being supported on an upright frame having corner legs which are indicated at 16 and 16'. The tank 15 is adapted to contain a fluid for coating the web which is advanced by the rollers 10 and 11 so that successive sections thereof may be torn off for use in a packaging operation.

Figure 2:
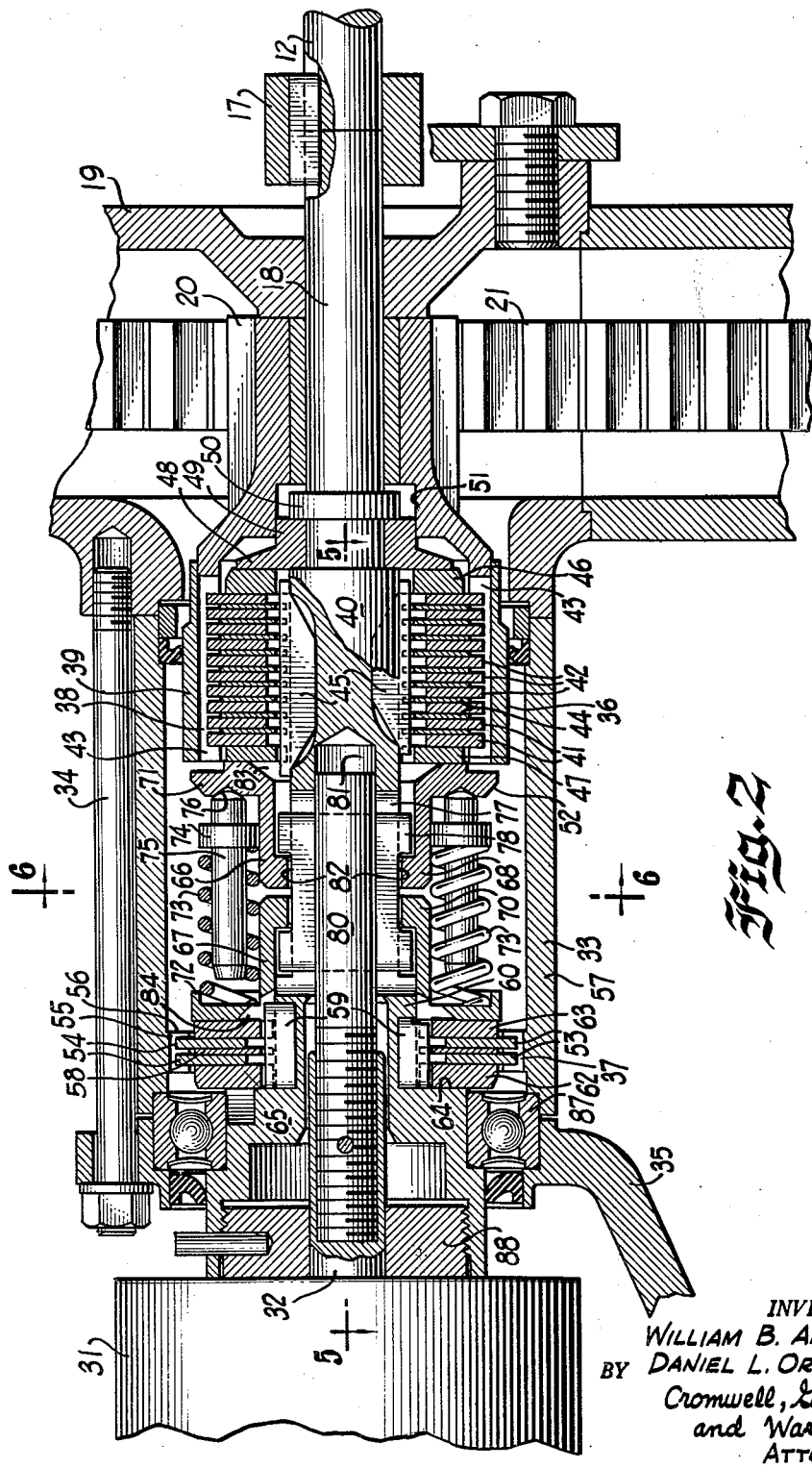
FIGURE 2 is a longitudinal section in a vertical plane through the control mechanism for the roll shaft, to an enlarged scale and with portions broken away, the mechanism being shown in a transitory position.

The driven roll shaft 12 is extended at one side of the tank 15 and connected by the coupling 17 with a relatively short extension shaft 18. The shaft 18 extends through an upright or vertical housing 19 and carries in rotatable relation thereon a toothed drive member or pinion 20 (FIGURE 2). The drive member 20 is in engagement with a vertically disposed, slidably mounted rack 21 which is connected at 22 to the free end of a piston rod 23 extending from the operating cylinder 24 which is powered by air or other fluid under pressure. The stroke of the rack 21 is adjustable by adjusting the position of the stop bolt 19' which is screwed into the top of the housing 19. The length of sheet fed by rotation of the feed roll 10 is, of course, determined by the length of the rack stroke. The air cylinder 24 is controlled automatically by sequence valves indicated at 25 and 26 which are connected to a four-way valve 27 operated by or under the control of the pivoted foot pedal 28. The valve 27 also controls a combination clutch and brake mechanism 30 through a double acting cylinder 31 which is powered by air or other fluid under pressure and which has a piston rod 32. The piston rod 32 of the air cylinder 31 is connected in axial alignment with the rotatably mounted drive shaft 18, the piston rod 32 and the shaft 18 extending into opposite ends of a horizontally disposed housing 33 which is attached to the outermost side of the vertically disposed housing 19 in which the rack 21 and the drive member 20 are enclosed.

The housing 33 (FIGURES 1 to 6) for the combination brake and clutch assembly 30 is secured to the rack housing 19 by circumferentially spaced bolts 34 which also secure the outer end of the housing to a supporting bracket indicated at 35. The air cylinder 31, which has a rotatably mounted piston and piston rod 32, is attached at the outer end of the housing 33 and also supported at its free end by the bracket 35.

A clutch assembly or unit 36 and a brake assembly or unit 37 are mounted in axial alignment in the housing 33 on the shaft 18 which is especially constructed to support the clutch and brake elements in operative relation thereon. The clutch assembly 36 (FIGURE 2) comprises a cylindrical outer shell or clutch ring 38 which is formed as an integral cup-like member on the drive member 20. The clutch ring 38 extends in a direction inwardly of the housing 33 and telescopes within an external bushing or sleeve member 39. A plurality of annular clutch discs or plates 41 are arranged at the end of a portion 40 of the shaft 18 which is of larger diameter than the portion thereof on which the drive member 20 is mounted. The clutch discs 41 have peripheral lugs 42 slidable in axial grooves or slots 43 spaced around the inner circumference of the ring 38 so as to connect the plates 41 in axial sliding relation therewith. A plurality of cooperating annular clutch discs or plates 44 are arranged in interleaved cooperating relation with the clutch discs 41 and are provided with spaced slots on their inner circumference for engaging with key members 45 to connect the plates 44 in axial sliding relation with the shaft 18. The two sets of clutch plates 41 and 44 are positioned between an annular thrust plate 46 and an annular pressure plate 47 which are axially spaced on the shaft 18 and connected to the latter for rotation therewith by the keys 45 in the same manner as the clutch plates 44. The thrust plate 46 is seated against the peripheral flange 48 of an annular retainer ring or disc 49 and the latter is seated between a peripheral shoulder or stop collar 50 on the shaft 18 and the abutment shoulder formed at the end of the shaft portion 40. The stop collar 50 is accommodated in a cylindrical recess 51 in the drive member 20 and the retainer ring 49 has a hub-like portion secured in the outer end of the recess 51 which serves to hold the drive member 20 against axial movement on the shaft 18. The pressure plate 47 is positioned at the other end of the clutch plate assembly and is adapted to be engaged by an operating or actuating mechanism 52 which will be hereinafter described.

The brake assembly 37 (FIGURE 2) comprises a pair of annular outer discs or plates 53 which have peripheral lugs 54 slidable in axial grooves or slots 55 spaced around the inner circumference of a rib-like, inwardly extending shoulder formation 56 in the cylindrical member 57 which forms the main or body portion of the housing 33. A cooperating annular inner disc or plate 58 is arranged between the two outer clutch plates 53 and provided with axial slots spaced around its inner circumferenec for engaging keys 59 which retain the same in axial non-rotatable, sliding relation on a relatively short section 60 of the shaft 18 which extends outwardly of the shaft section 40 and which is of somewhat greater diameter. The interleaved clutch plates 53 and 58 are positioned between an annular thrust plate 62 and an annular pressure plate 63, both of which are slotted on their inner circumference to receive the keys 59 so as to secure these plates in non-rotatable, axial sliding relation on the shaft section 60. The thrust plate 62 is seated against the abutment or shoulder forming face 64 of the end section 65 of the shaft 18 which adjoins the shaft section 60 and which is of still larger diameter, so that the thrust plate 62 does not move in an axial direction relative to the shaft 18 while the pressure plate 63 is at the inner end of the shaft section 60 and is axially movable to apply pressure to the interleaved brake plates 53 and 58 for braking the shaft 18.

With the clutch and brake assemblies 36 and 37 in the position shown in FIGURE 2, the clutch 36 and the brake 37 are both held in operative or plate engaging relation by pressure applying mechanism which is carried on the shaft section 40 between the clutch and brake assemblies 36 and 37. This mechanism comprises a pair of sleeve members 66 and 67 having inwardly directed flange portions 68 and 70 at their adjacent ends and outwardly directed flange formations 71 and 72 at their opposite ends. The inner flanges 68 and 70 slidingly support the sleeves 66 and 67 on the shaft section 40 and have their end faces in oppositely disposed facing relation to each other. At the other ends of the sleeve members 66 and 67 the outwardly directed peripheral flange formations 71 and 72 have their oppositely facing end surfaces engaging against the pressure plate 47 of the clutch assembly 36 and the pressure plate 63 of the brake assembly 37, respectively. A plurality of compression springs 73 are arranged around the periphery of the sleeve members 66 and 67 with one end of each spring seated against the flange 72 of the sleeve member 67 and the other end thereof seated against a collar or shoulder formation 74 adjacent the one end of a spring supporting pin 75 which has the latter end engaging in a socket 76 provided in the flange 71 of the sleeve member 66 so that the compression springs 73 urge the pressure applying flange members 71 and 72 in opposite directions and constantly apply pressure to the brake and clutch engaging pressure plates 47 and 63 when the sleeve members 66 and 67 are in the central or transitory position shown in FIGURE 2. The shaft section 40 is provided with a radially and axially extending elongate slot 77 (FIGURES 2 to 7) which receives a plate-like key member 78 carried adjacent the inner or free end of a mounting pin 80 which has its outer end threadedly engaged in an axial bore or socket in the end of the piston rod 32. The end of the piston rod 32 and the projecting end of the pin 80 extend in axially slidable relation in the axial bore 81 in the shaft 18 which terminates short of the end of the shaft section 40. The pin 80 has a sliding fit in the inner end portion of the bore 81 and serves to hold the piston rod 32 and the shaft 18 in axial alignment while permitting movement of the piston rod 32 along the axis of the two members. The key 78 has a length which is less than the length of the slot 77. It has a width transversely of the shaft which is greater than the corresponding dimension of the slot 77 and slightly less than the internal diameter of the sleeve members 66 and 67. The key 78 has its opposite side edges slotted at 82 with the length of the slot in the direction of the axis of the shaft 18 being greater than the combined thickness or width of the flanges 68 and 70 on the sleeve members 66 and 67 so that in the transitory position as shown in FIGURE 2, the flanges 68 and 70 are spaced apart a small distance and extend into the slots 82 whereby movement of the key 78 in the slot 77 along the axis of the shaft 18 will pick up, first, one of the sleeve members 66 and 67, and then the other thereof, depending upon the direction of movement, with the result that the pressure of the springs 73 is shifted to release either the brake or the clutch and to increase the pressure on whichever one of these is not released depending upon the direction of movement of the key 78. When the key 78 is moved to the left as shown in FIGURE 3 the clutch is disengaged and maximum pressure is applied for engagement of the brake. When the key 78 is moved to the right as shown in FIGURE 4, the brake is released and maximum pressure is applied to the clutch. The sleeve members 66 and 67 are provided with internal key receiving slots 83 and 84 to prevent relative rotation of these members on the shaft 18 when they are moved to apply maximum pressure to the clutch and brake assemblies. These members also have their flanges 68 and 70 slotted at 85 and 86 (FIGURES 6 and 7) to permit assembly with key 78.

The end of the shaft 18 is rotatably supported in the outer end of the housing 33 (FIGURE 2) by means of the ball bearing assembly 87 which is mounted in recesses provided in the shaft end portion 65 and the end of the housing 33. The end portion 65 of shaft 18 has an internally threaded end margin within which the rotating portion 88 of the air motor 31 is secured so that the piston rod 32 rotates with the shaft 18.

In operating the mechanism as illustrated, the brake is engaged and the clutch disengaged when the roll shaft 12 is stopped. To initiate a feeding cycle the operator presses the foot pedal 28 which actuates the cylinder or motor 31 through the valve 27 so that the piston rod 32 is extended and moves the key 78 to the position shown in FIGURE 4 which applies pressure to the clutch plates and locks the drive member 20 to the shaft 18. The cylinder 24 is operated by the valves 25 and 26 and the rack 21 is advanced to rotate the power member 20 for turning the roll shaft 12 to advance the web between the rolls 10 and 11. When the rack 21 reaches the end of its movement, the roll shaft 12 comes to a positive and quick stop. This stop is made less shocking by a built-in cushion (not shown) in cylinder 24 at the lower or blind end. When the operator releases the foot pedal 28, the cylinder 31 is operated to retract the piston rod 32 and move the key 78 to the left in FIGURE 2 so as to release the clutch and apply maximum pressure to the brake as shown in FIGURE 3. Valves 25 and 26 then operate automatically to cause cylinder 24 to return rack 21 to the initial position, during which time the roll shaft is stationary. The cycle can then be repeated by operation of the foot pedal 28. With the brake and clutch arrangement 30, the roll shaft 12 is under constant control and is at no time free to rotate in response to a pull on the leading end of the web by the operator. Even in the transitory position shown in FIGURE 2, the clutch and the brake are both engaged so that the shaft 18 is never free to rotate but is always under the control of either the clutch or the brake. To insure that there is no motion of the rack 21 when both the brake and the clutch are engaged (FIGURE 2) an interlocking means is provided, which is not a part of this invention.

While particular materials and specific details of construction have been referred to in describing the form of the apparatus illustrated, it will be understood that other materials and equivalent details of construction may be resorted to within the spirit of the invention.

We claim:

1. A rotatably mounted shaft member having an end thereof extended into a fixed housing, a drive member having a pinion forming portion rotatably mounted on said shaft end, a reciprocably mounted rack engaging the pinion portion of said drive member, power means for reciprocating said rack, a plate clutch assembly mounted on the extended shaft end adjacent said drive member, which clutch assembly comprises annular clutch plates mounted on said shaft end and cooperating annular clutch plates mounted in a clutch ring connected to said drive member, a brake mounted on said shaft end in axially spaced relation to said clutch assembly, which brake assembly comprises cooperating interleaved annular brake plates mounted on said shaft end and said fixed housing, respectively, a pair of sleeve members slidably mounted on said shaft end between said clutch and brake assemblies, said sleeve members having radial flanges extending in opposite directions at the ends thereof, peripherally spaced compression springs supported on said sleeve members between the flanges at opposite ends of said sleeve members which urge said flanges into pressure applying engagement with the clutch plates and the brake plates, respectively, when said sleeve members are free to slide on said shaft end, said shaft end having an axial bore, a pin slidably mounted in said bore, a radially and axially extending slot in said shaft end which communicates with said bore, a key member secured on said pin and movable in said slot with portions thereof projecting at opposite sides of said shaft end and engaging the flanges of said sleeve members at the ends thereof which are adjacent each other and a reciprocating rod mounted at the extremity of said shaft end and secured to said pin.

2. A rotatably mounted shaft member having an end thereof extended into a fixed housing, a drive member having a pinion forming portion rotatably mounted on said shaft end, a reciprocably mounted rack engaging the pinion portion of said drive member, fluid operated power means for reciprocating said rack, a plate clutch assembly mounted on the extended shaft end adjacent said drive member, which clutch assembly comprises annular clutch plates mounted on said shaft end and cooperating annular clutch plates mounted in a clutch ring connected to said drive member, a brake assembly mounted on said shaft end in axially spaced relation to said clutch assembly which brake assembly comprises cooperating interleaved annular brake plates mounted on said shaft end and said fixed housing, respectively, a pair of sleeve members slidably mounted on said shaft end between said clutch and brake assemblies, said sleeve members having outwardly extending radial flanges at the oppositely disposed ends thereof and inwardly extending radial flanges at the adjacent ends thereof, peripherally spaced compression springs supported on said sleeve members between said outwardly extending flanges which urge said flanges into pressure applying engagement with the clutch plates and the brake plates, respectively, when said sleeve members are free to slide on said shaft end, said shaft end having an axial bore, a pin slidably mounted in said bore, a radially and axially extending slot in said shaft end and communicating with said bore, a plate-like key member secured on said pin and movable in said slot with the edges thereof projecting at opposite sides of said shaft end, a notch in each of said projecting key edges which receives the inwardly extending flanges of said sleeve members, and a fluid motor having a reciprocating piston rod which is rotatably mounted at the extremity of said shaft end so that said piston rod projects into the bore in said shaft end and is secured to said pin.

3. A rotatably mounted shaft member having an end thereof extended into a fixed housing, a drive member having a pinion forming portion rotatably mounted on said shaft end, a reciprocably mounted rack engaging the pinion portion of said drive member, power means for reciprocating said rack, a disc clutch assembly mounted on the extended shaft end adjacent said drive member, which clutch assembly comprises clutch discs mounted on said shaft end and cooperating clutch discs mounted in a cup-like clutch ring forming portion of said drive member, a disc brake assembly mounted on said shaft end in axially spaced relation to said clutch assembly which brake assembly comprises cooperating interleaved brake discs mounted on said shaft end and said fixed housing, respectively, a pair of sleeve members slidably mounted on said shaft end between said clutch and brake assemblies, said sleeve members having outwardly extending radial flanges at the oppositely disposed ends thereof forming pressure applying members for said clutch and brake assemblies, peripherally spaced compression members carried between said outwardly extending flanges which urge said flanges into pressure applying engagement with the clutch and brake discs, respectively, in the neutral position of said sleeve members, said shaft end having an axial bore, an actuator rod extending into said bore, means on said actuator rod connecting said rod with said shaft end and with said sleeve members so that said rod rotates with said shaft end and said sleeve members move axially along said shaft end in response to axial movements of said rod, and means to reciprocate said rod which is connected to operate in timed relation to the reciprocation of said rack.

4. A rotatably mounted shaft member having an end thereof extended into a fixed housing, a drive member rotatably mounted on said shaft end, said drive member having a pinion forming portion and a cup-like flange forming portion, a reciprocably mounted rack engaging the pinion portion of said drive member, power means for reciprocating said rack, a plate clutch assembly mounted on the extended shaft end adjacent said drive member, which clutch assembly comprises cooperating interleaved clutch plates mounted on said shaft end and in the cup-like portion of said drive member, a brake assembly mounted on said shaft end in axially spaced relation to said clutch assembly which brake assembly comprises cooperating interleaved annular brake plates mounted on said shaft end and said fixed housing, respectively, a pair of sleeve-like actuator members mounted in axially movable relation on said shaft end between said clutch and brake assemblies, said actuator members having pressure applying flanges at the oppositely disposed ends thereof, peripherally spaced compression springs supported on said actuator members between said pressure applying flanges which urge said flanges into pressure engagement with the clutch plates and the brake plates, respectively, in the central position of said actuator members, said shaft end having an axial bore, a rod member mounted in said bore for axial reciprocating movement, power means for reciprocating said rod member, a radially and axially extending slot in said shaft end and communicating with said bore, a relatively flat plate-like rectangular key member secured on said rod member and movable in an axial direction in said slot with the edges thereof projecting at opposite sides of said shaft end, a notch in each of said projecting key edges, said actuator members having portions extending into said notches so that said actuator members move axially on said shaft end in response to movements of said rod member, and manually actuated operating mechanism connected to the power means for said rack and said rod member whereby when said rack member is operated said clutch and brake assemblies are actuated automatically to first rotate the shaft member and thereafter to hold the shaft member in a stationary condition after it has come to a positive stop.

5. A rotatably mounted shaft member having a portion thereof extending into a fixed housing, a drive member rotatably mounted on said shaft, said drive member having a pinion portion and an axially extending flange portion, a reciprocably mounted rack engaging the pinion portion of said drive member, a fluid motor connected to said rack for reciprocating said rack, a clutch assembly mounted on the shaft adjacent said drive member, which clutch assembly comprises cooperating clutch plates mounted on said shaft and the flange portion of said drive member, respectively, a brake assembly mounted on said shaft in axially spaced relation to said clutch assembly which brake assembly comprises cooperating brake plates mounted on said shaft and said fixed housing, respectively, a pair of actuator sleeve members mounted for axial movement on said shaft between said clutch and brake assemblies, said sleeve members having pressure applying flanges at the oppositely disposed ends thereof, peripherally spaced compression springs each seated at one end against the flange of one of said sleeve members and having support pins therefor with their free ends engaging the flange of the other sleeve member so as to urge said flanges into pressure applying engagement with the clutch plates and the brake plates, respectively, said shaft end having an axial bore, a pin mounted in non-rotatable sliding relation in said bore, an elongate radial slot in said shaft between said clutch and brake assemblies, a flat key member secured on said pin and movable in said slot with axially spaced edge portions thereof projecting radially at opposite sides of said shaft and engaging with said sleeve members when said pin is reciprocated, a fluid motor having connection with said pin for reciprocating said pin, and a manually controlled fluid connection with said fluid motors for actuating said motors to rotate said shaft and to bring said shaft to a positive stop after predetermined rotation thereof.

6. In a control mechanism for a rotatably mounted shaft, a stationary housing enclosing a portion of said shaft, a driving member rotatably mounted on a portion of said shaft, a plate clutch assembly mounted on said shaft portion adjacent said driving member, said clutch assembly comprising clutch plates mounted on said shaft portion and cooperating clutch plates mounted on said drive member, a plate brake assembly mounted on said shaft portion in axially spaced relation to said clutch assembly, said brake assembly comprising a brake plate mounted on said shaft portion and cooperating brake plates mounted in said stationary housing, and an actuating mechanism mounted on said shaft portion between said clutch and brake assemblies which comprises a pair of spaced pressure applying members, compression springs between said pressure applying members urging the same apart and along said shaft portion so as to engage both the clutch and the brake, when in a neutral position, a fluid motor having a rotatable piston rod mounted on the end of said shaft portion in axial alignment therewith, an actuating key carried on said piston rod and connected with said pressure applying members so as to selectively move said pressure applying members and said compression springs in one direction to disengage the brake and increase the clutch engaging pressure to a maximum and in the opposite direction to disengage the clutch and increase the brake engaging pressure to a maximum.

7. In a control mechanism for a rotatably mounted shaft, a stationary housing enclosing a portion of said shaft, a driving member rotatably mounted on said shaft, a plate clutch assembly mounted on said shaft portion adjacent said driving member, said clutch assembly comprising annular clutch plates mounted on said shaft portion and cooperating annular clutch plates mounted on said drive member, a plate brake assembly mounted on said shaft portion in axially spaced relation to said clutch assembly, said brake assembly comprising an annular brake plate mounted on said shaft portion and cooperating annular brake plates mounted in said stationary housing, and an actuating mechanism for said clutch and brake assemblies mounted on said shaft portion which comprises a pair of sleeve members slidably mounted on said shaft portion between said clutch and brake assemblies and having outwardly extending pressure applying flanges at the oppositely disposed ends thereof, compression springs carried on said sleeve members between said pressure applying flanges which are operative to urge the same in an axial direction along said shaft portion to engage said flanges with the clutch and the brake, when in a neutral position, a fluid motor having a rotatably mounted reciprocating piston rod on the end of said shaft portion and in axial alignment therewith, a key member carried on said piston rod and connected with said sleeve members so as to move said sleeve members and said compression springs in one direction to disengage the brake and increase the clutch applying pressure to a maximum and in the opposite direction to disengage the clutch and increase the brake applying pressure to a maximum.

8. In a control mechanism for a rotatably mounted member, a stationary housing enclosing a shaft forming portion of said member, a driving member rotatably mounted on said shaft portion, a plate clutch assembly mounted on said shaft portion adjacent said driving member, said clutch assembly comprising cooperating interleaved sets of clutch plates mounted on said shaft portion and on said drive member, respectively, a plate brake assembly mounted on said shaft portion in axially spaced relation to said clutch assembly, said brake assembly comprising cooperating interleaved sets of brake plates mounted on said shaft portion and in said stationary housing, and an actuating mechanism mounted on said shaft portion between said clutch and brake assemblies which comprises a pair of pressure applying members mounted in axially movable relation on said shaft portion, compression springs between said pressure applying members urging the same apart and along said shaft portion so as to engage both the clutch and the brake, when said pressure applying members are in a neutral position, a fluid motor having a rotatable piston rod mounted at the end of said shaft portion with the piston rod and the shaft portion in axial alignment, an actuating key carried on said piston rod and connected with said pressure applying members so as to engage one of said pressure applying members when said piston rod is moved in one direction to release the brake and increase the clutch engaging pressure and to engage the other one of said pressure applying members when said piston rod is moved in the opposite direction to release the clutch and increase the brake applying pressure.

9. In a control mechanism for a rotatably mounted shaft, a stationary housing enclosing a portion of said shaft, a driving member rotatably mounted on said shaft, a plate clutch assembly mounted on said shaft adjacent said driving member, said clutch assembly comprising cooperating annular clutch plates mounted on said shaft and on said drive member, a plate brake assembly mounted on said shaft in axially spaced relation to said clutch assembly, said brake assembly comprising cooperating annular brake plates mounted on said shaft and in said stationary housing, and an actuating mechanism for said clutch and brake assemblies, which actuating mechanism comprises a pair of sleeve members mounted in relatively movable slidable relation on said shaft portion between said clutch and brake assemblies and having radially disposed pressure applying flanges adjacent the opposite ends thereof, compression springs carried on said sleeve members between said pressure applying flanges which are operative to urge said sleeve members in an axial direction along said shaft so as to engage said flanges with both the clutch and the brake, when in a neutral position, a fluid motor mounted at the end of said shaft and having a rotatable reciprocating piston rod disposed in slidable relation in an axial bore in the end of said shaft, said shaft having a radially extending slot communicating with said bore and a key member carried on said piston rod and extending through said slot so as to engage with said sleeve members and to move said sleeve members and the compression springs carried thereon out of said neutral position in one direction to disengage the brake and increase the clutch applying pressure and in the opposite direction to disengage the clutch and increase the brake applying pressure.

References Cited in the file of this patent

UNITED STATES PATENTS

| | | |
|---|---|---|
| 2,175,382 | Eason | Oct. 10, 1939 |
| 2,185,551 | Glasner et al. | Jan. 2, 1940 |
| 2,205,989 | Meyers et al. | June 25, 1940 |
| 2,440,304 | Simmons | Apr. 27, 1948 |
| 2,908,369 | Frey et al. | Oct. 13, 1959 |
| 2,932,372 | Gehrer et al. | Apr. 12, 1960 |

FOREIGN PATENTS

| | | |
|---|---|---|
| 102,892 | Switzerland | Jan. 2, 1924 |
| 359,554 | Italy | May 30, 1938 |
| 956,237 | France | July 25, 1949 |